United States Patent
Pham et al.

(10) Patent No.: US 10,494,096 B1
(45) Date of Patent: Dec. 3, 2019

(54) METHODS AND SYSTEMS FOR PROCESSING PUBLIC ANNOUNCEMENTS ON A TRANSPORTATION VEHICLE

(71) Applicant: Panasonic Avionics Corporation, Lake Forest, CA (US)

(72) Inventors: Thong Pham, Irvine, CA (US); Bradley Westerhoff, Corona, CA (US); Nigel Blackwell, Lake Forest, CA (US); Changhwa Lin, Irvine, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 16/044,091

(22) Filed: Jul. 24, 2018

(51) Int. Cl.
  *B64D 11/00* (2006.01)
  *H04W 4/40* (2018.01)
  *H04W 4/12* (2009.01)
  *H04W 4/06* (2009.01)

(52) U.S. Cl.
  CPC ........... *B64D 11/0015* (2013.01); *H04W 4/06* (2013.01); *H04W 4/12* (2013.01); *H04W 4/40* (2018.02)

(58) Field of Classification Search
  CPC ...... B64D 11/0015; H04W 4/40; H04W 4/06; H04W 4/12
  See application file for complete search history.

(56) References Cited

U.S. PATENT DOCUMENTS

| 9,749,664 | B1* | 8/2017 | Watson | H04N 21/23424 |
| 2009/0007194 | A1* | 1/2009 | Brady, Jr. | H04N 7/10 725/77 |
| 2009/0034540 | A1* | 2/2009 | Law | H04L 12/462 370/400 |
| 2010/0189120 | A1* | 7/2010 | Diab | H04L 12/40 370/401 |
| 2011/0162015 | A1* | 6/2011 | Holyoake | H04N 7/18 725/76 |

OTHER PUBLICATIONS

Schneele, et al., "Comparison of IEEE AVB and AFDX", 31$^{st}$ Digital Avionics Systems Conference, Oct. 16-20, 2012.
Geyer, et al., "Evaluation of Audio/Video Bridging Forwarding Method in an Avionics Switched Ethernet Context", IEEE, 2013.

* cited by examiner

*Primary Examiner* — Emily C Terrell
(74) *Attorney, Agent, or Firm* — Klein, O'Neill & Singh, LLP

(57) ABSTRACT

Methods and systems for a transportation vehicle are provided. One method includes receiving a network packet at a network interface device of an information system of a transportation vehicle; identifying public announcement audio in a payload of the network packet by the network interface device; extracting the public announcement audio from the payload of the network packet by the network interface device; transferring the public announcement audio to an audio system by the network interface device; and playing the public announcement audio by the audio system.

20 Claims, 20 Drawing Sheets

FIG. 3E

METHODS AND SYSTEMS FOR PROCESSING PUBLIC ANNOUNCEMENTS ON A TRANSPORTATION VEHICLE

TECHNICAL FIELD

The present disclosure relates to transportation vehicles in general, and more particularly, to efficiently processing public announcements on a transportation vehicle.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

Public announcements (PAs) are routinely made on transportation vehicles. The systems presenting PAs on a transportation vehicle may have to adhere to certain software design assurance levels. For example, on aircraft, the system presenting PAs may be required to meet a software design assurance level, Level D for example, as described in DO-178B and DO-178C, Software Considerations in Airborne Systems and Equipment Certification, published by RICA, Inc.

This can be challenging for the software/hardware providers that may be executing other software applications at a lesser design assurance level, Level E for example, or a lesser assurance level than Level D. To meet Level D, the software/hardware providers may have to upgrade and change software code for different applications. This is commercially undesirable and burdensome. Continuous efforts are being investigated to develop technology for processing PA announcements with Level D assurance, while other software applications continue to be executed at Level E.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

Figure 3E:
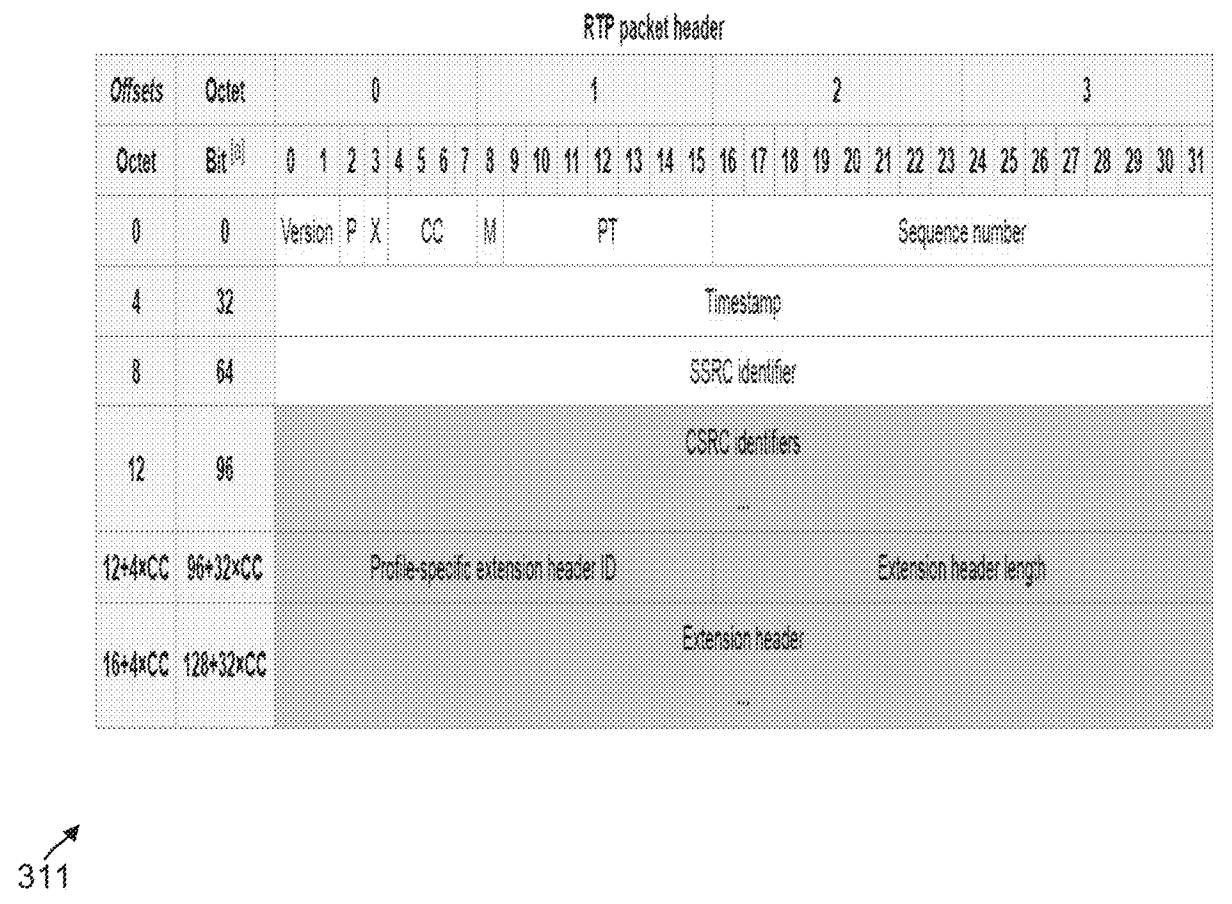

FIG. 3E shows an example of a RTP (Real-time Transport Protocol) frame, used according to one aspect of the present disclosure.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Figure 1A:
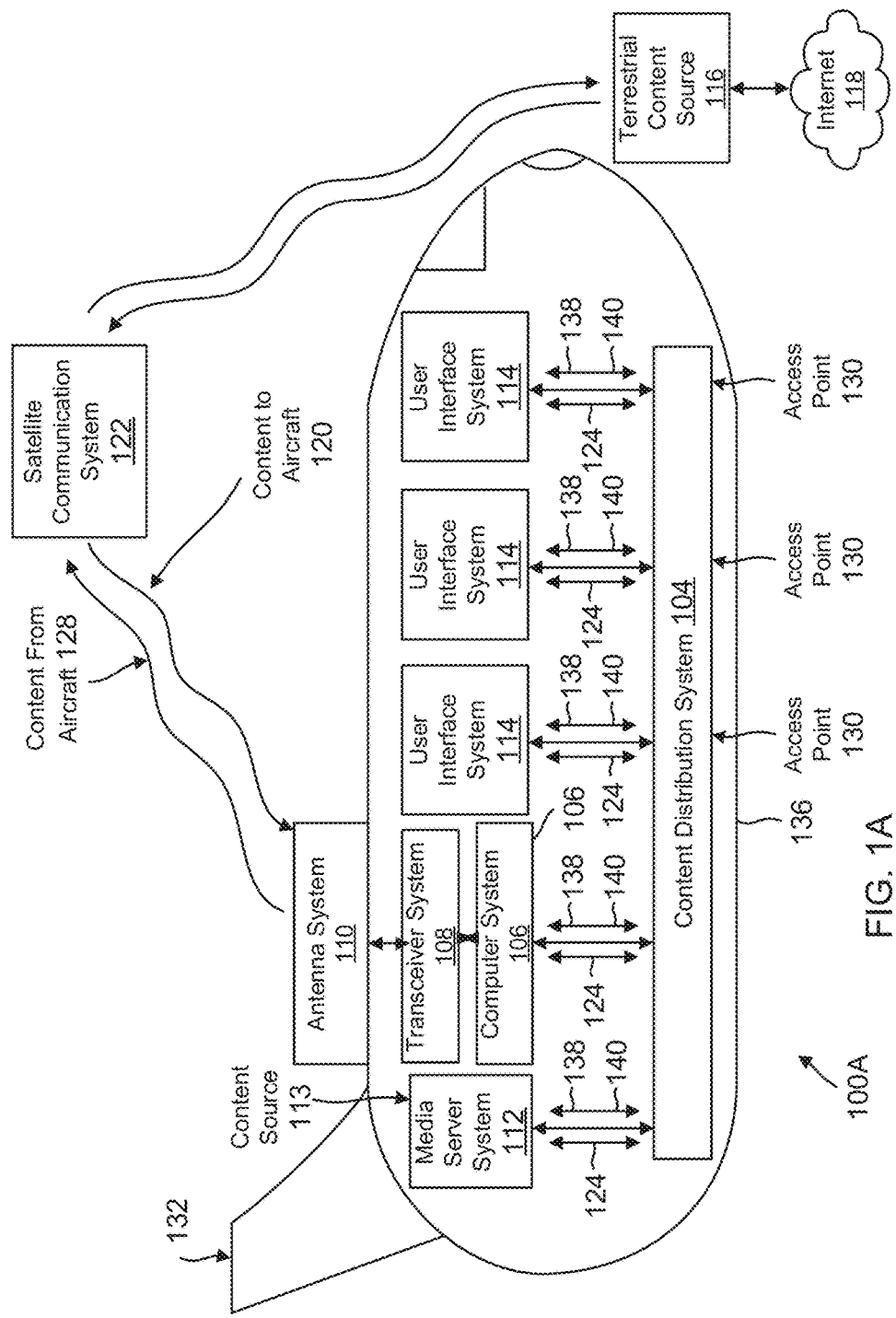
FIG. 1A shows an example of an operating environment for implementing the various aspects of the present disclosure on an aircraft.

Vehicle Information System:

FIG. 1A shows an example of a generic vehicle information system 100A (also referred to as system 100A) that can be configured for installation aboard an aircraft 132, according to one aspect of the present disclosure. When installed on an aircraft, system 100A can comprise an aircraft passenger IFE system, such as the Series 2000, 3000, eFX, eX2, eXW, eX3, and/or any other in-flight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photographic album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122.

System 100A can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114 including a personal electronic device (PED), as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system. In at least one embodiment, the user interface system 114 comprises a software application that a user downloads and installs on a PED to receive and view content via an access point 130. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and most commonly includes a touch screen. Other input devices may include a microphone for voice input, one or more switches (or pushbuttons), such as a keyboard or a keypad, and/or a pointing device, such as a mouse, trackball, or stylus, all of which are conventionally known techniques for inputting information.

In one aspect, the user interface system 114 is provided at individual passenger seats of aircraft 132 at overhead/shared devices, and/or audio only output devices (speakers). The user interface system 114 can be adapted to different aircraft and seating arrangements and the adaptive aspects described herein are not limited to any specific seat arrangements or user interface types.

Figure 1B:
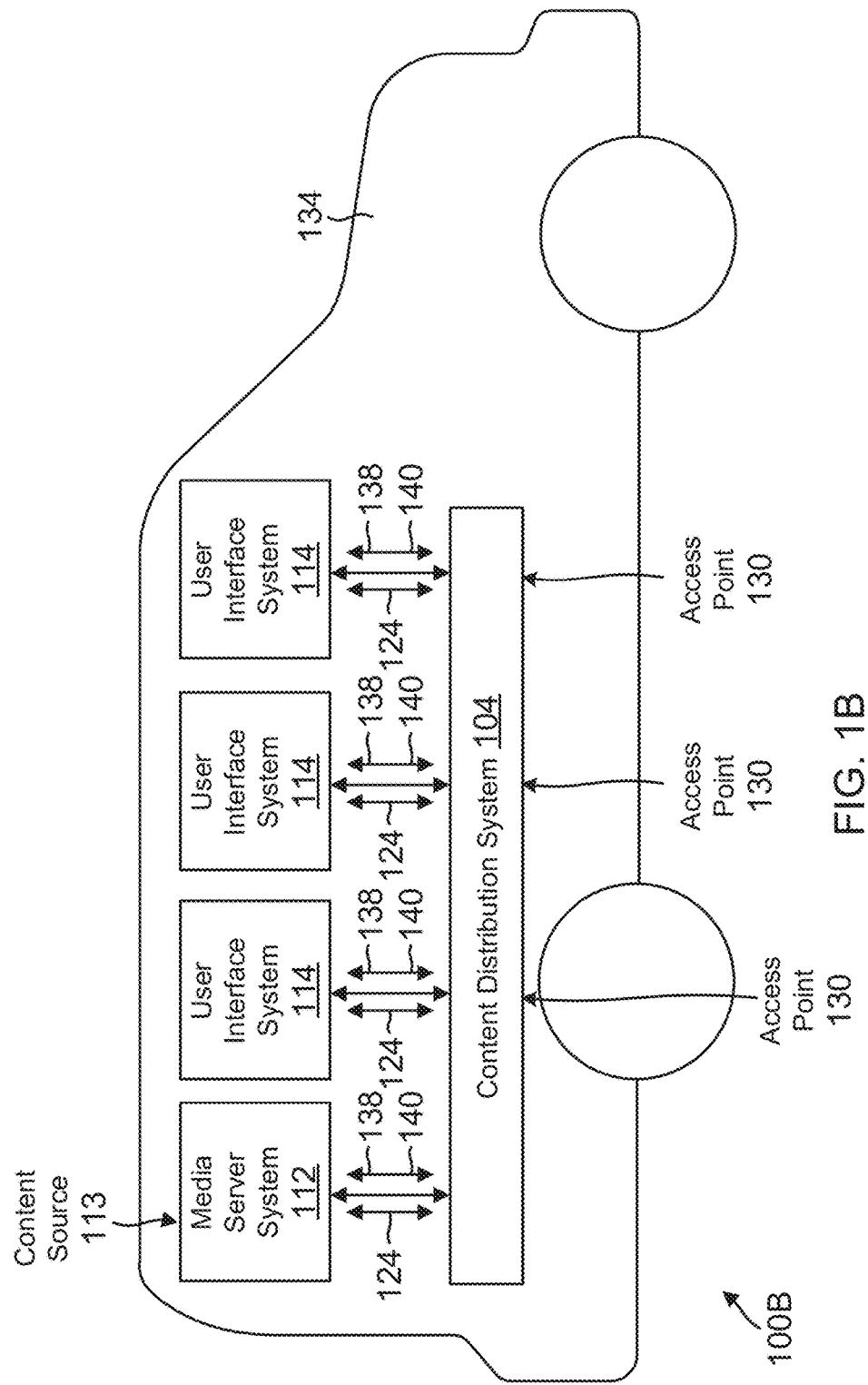
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
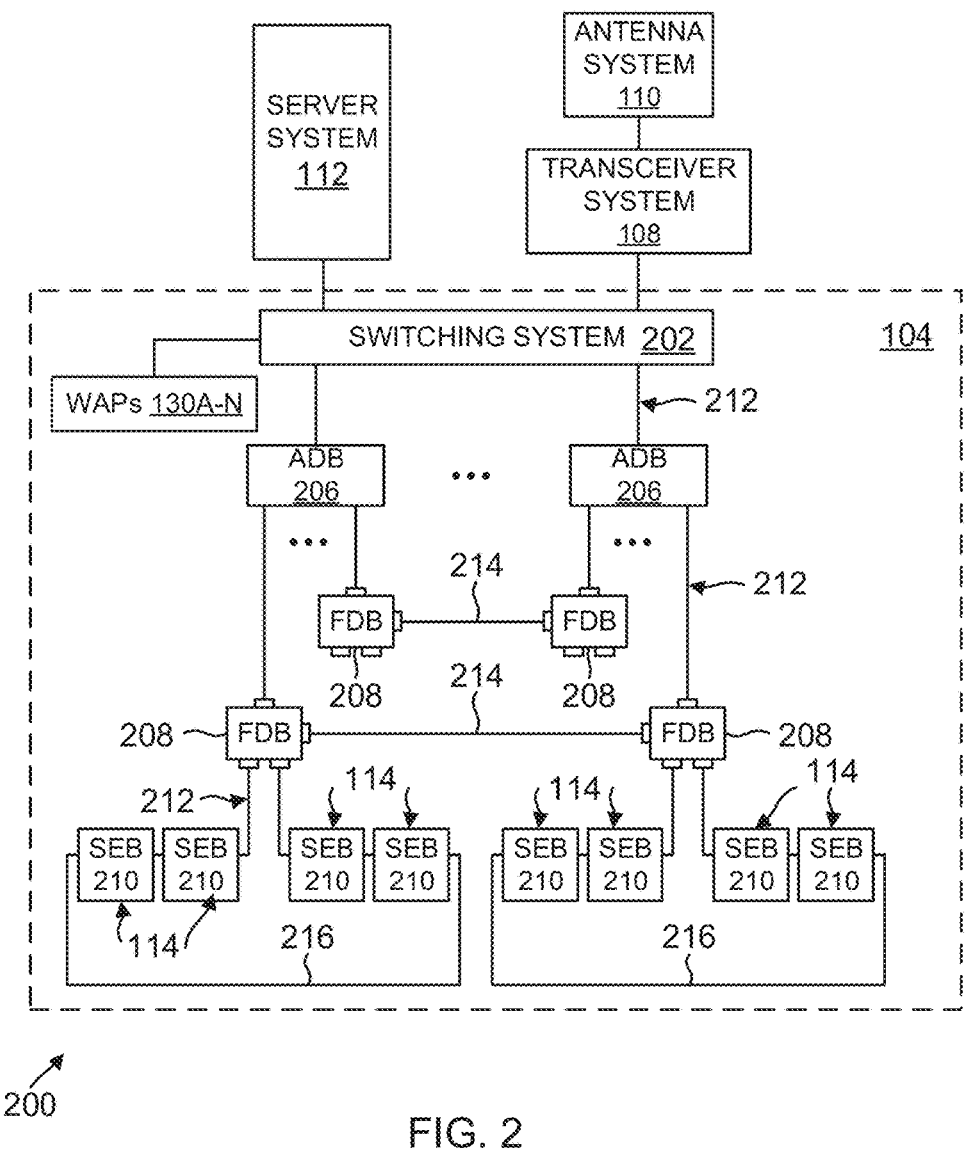
FIG. 2 shows an example of a content distribution system, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as Base-T1, 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
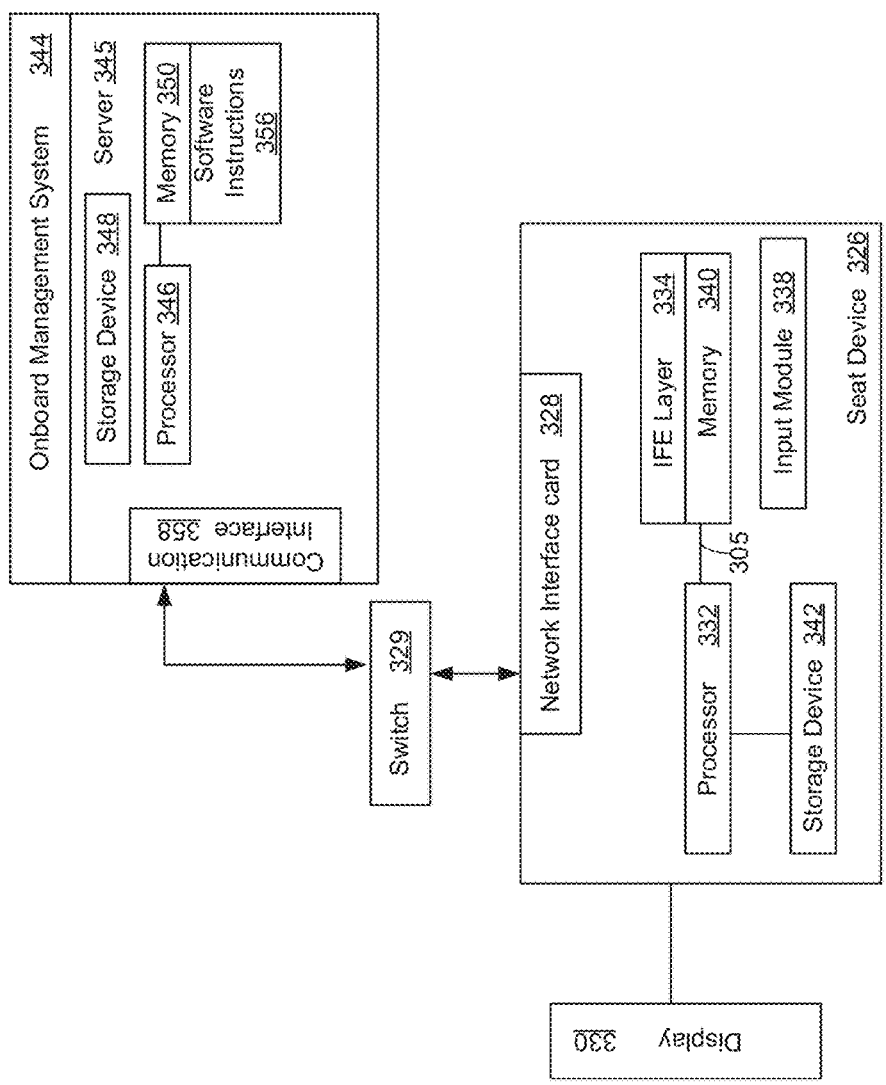
FIG. 3A shows an example of an overall system for delivering public announcements (PAs) on a transportation vehicle, according to one aspect of the present disclosure.

System 300:

FIG. 3A shows an example of a system 300, according to one aspect of the present disclosure. System 300 includes a seat device 326 with a display 330 and an onboard management system 344. In one aspect, the onboard management system 344 may be similar to computer system 106 and/or server 112 described above with respect to FIGS. 1A/1B.

As an example, seat device 326 may be referred to as a "smart monitor", with an integrated display 330. The software/hardware for the smart monitor is preferably of conventional design for use on transportation vehicles. For example, smart monitors sold by Panasonic Avionics Corporation of Lake Forest, Calif., may be used. Smart monitors of other types and from other manufacturers may be used as well for implementing the adaptive aspects of the present disclosure.

In one aspect, the onboard management system 344 includes a server 345 (similar to the media server 112 and/or the computer system 106). The server 345 includes a processor 346 that has access to a memory 350 via a bus system/interconnect (not shown). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data, applications and program files. Software instructions 356 of the onboard management system 344 are executed by the processor 346 to control the overall operation of the server 345. Software instructions 356 may be used to generate a public announcement (PA) audio using audio video bridging (AVB) packets encapsulated in network packets (for example, Ethernet packets) as described below. In another aspect, software instructions 356 may be used to generate a PA audio packet in a non-AVB format, e.g., using the real time protocol (RTP) format.

In one aspect, server 345 communicates with the seat device 326 via a communication interface 358 and switch 329 (similar to switching system 202, FIG. 2). The switch 329 may be an Ethernet switch. The communication interface 358 includes one or more interfaces for a network connection.

In one aspect, the seat device 326 also includes a processor 332, a memory 340, a network interface card (NIC) 328 and a local storage device 342 for storing content. The seat device 326 receives user input/requests via an input module 338. The input module 338 may be configured to use a local touch screen included with display 330, a local virtual keyboard, an external mouse, external keyboard or any other input device. The various adaptive aspects described herein are not limited to any specific input device.

Processor 332 has access to memory 340 via an interconnect 305. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 305 is an abstraction that represents any one or more separate physical buses and/or point-to-point connections, connected by appropriate bridges, adapters and/or controllers. The bus system 305, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 336 executes various software applications including an IFE layer 334 out of memory 350. The IFE layer 334 is configured to provide in-flight entertainment and other options to users. The IFE layer 334 provides audio/video content as well as controls for accessing the content. The IFE layer 334 and other applications are typically configured to be executed meeting software Design Assurance Level E. As provided in DO-178B or DO-178C, Software Considerations in Airborne Systems and Equipment Certification, failure of software having Design Assurance Level E has no impact on safety or aircraft operation.

In comparison, failure of software having Design Assurance Leve D may have a minor effect on safety or aircraft operation.

It is noteworthy that the IFE layer 334 or portions thereof may also be executed by server 345. The adaptive aspects described herein are not limited to any specific location for executing IFE layer 334.

The seat device 326 uses the NIC 328 to interface with the onboard management system 344. The NIC 328 includes logic and circuitry for interfacing with the onboard management system 344 as described below in detail.

The seat device 326 at the aircraft may be part of the user interface system 114 or interfaces with the user interface system 114 also described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific location or orientation of the seat device 326.

Figure 3B:
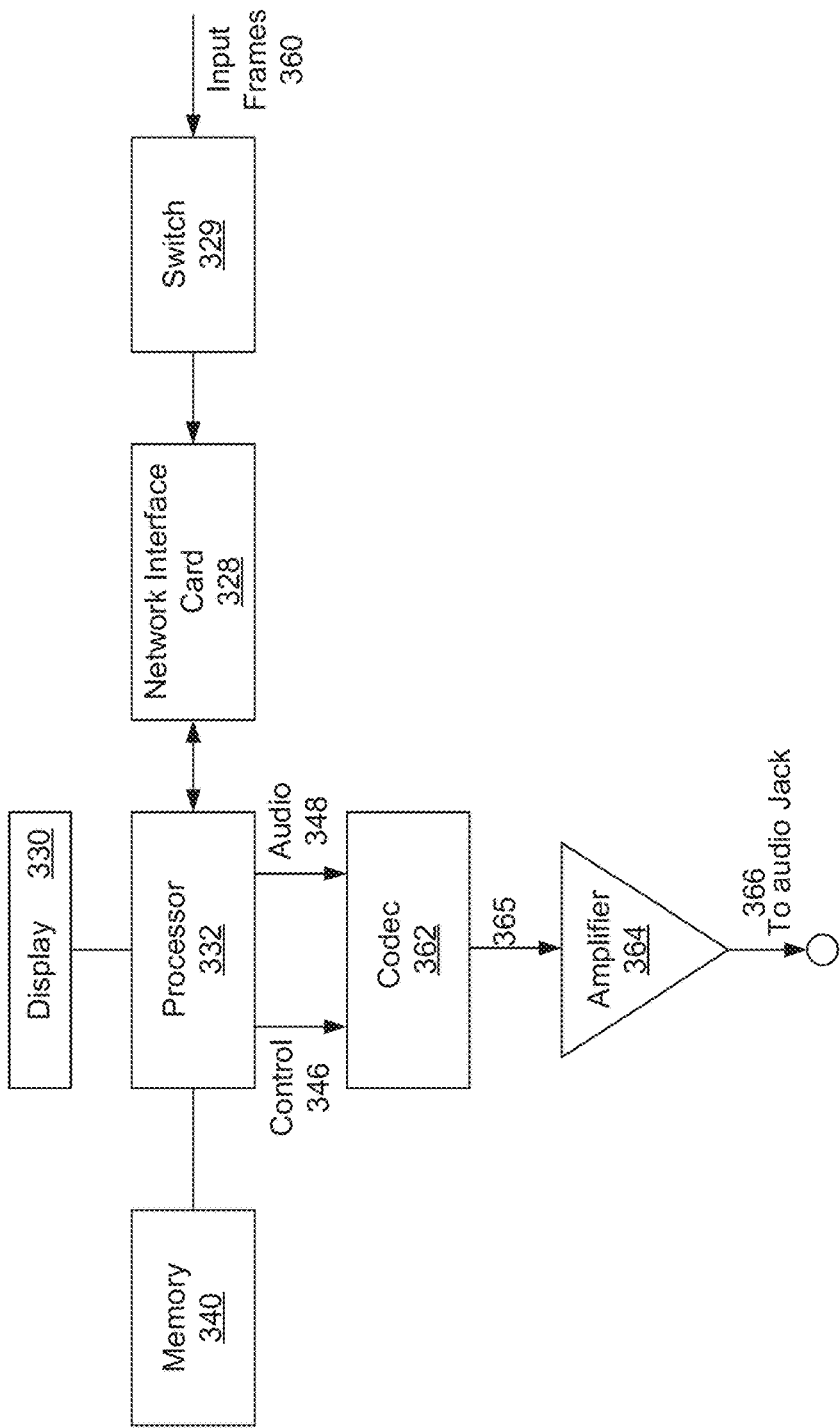
FIG. 3B shows a conventional system for processing PAs on a transportation vehicle.

FIG. 3B shows an example of a conventional system for processing input network frames 360 sent to seat device 326. The input frames 360 may include PA audio. The input frames 360 are received by NIC 328 via switch 329. NIC 328 forwards frames 360 to the processor 332. The processor 332 then generates a control signal 346 and provides digital audio 348 from the payload of frames 360 to a Codec 362. Codec 362 includes a digital to analog converter (DAC) and analog to digital converter (ADC). Codec 362 generates an analog audio output 365 that is provided to an amplifier 364. The amplifier 364 processes the analog input 365 to generate an output 366 that may be played using an audio jack.

The system of FIG. 3B has challenges if the PA announcement has to be certified to software Design Assurance Level D because processor 332 executes software instructions out of memory 340 that are not certified to Level D and instead may be Level E, a lesser assurance level than Level D. To meet the Level D requirements for the system in FIG. 3B, all the code in memory 340 must be upgraded to become Level D compliant. This can be cumbersome because the seat device provider will have to redesign/upgrade all Level E applications to meet the Level D requirements. The various aspects of the present disclosure overcome these challenges by partitioning the PA announcement code/system from the software instructions that are executed out of memory 340, as described below in detail.

Figure 3C:
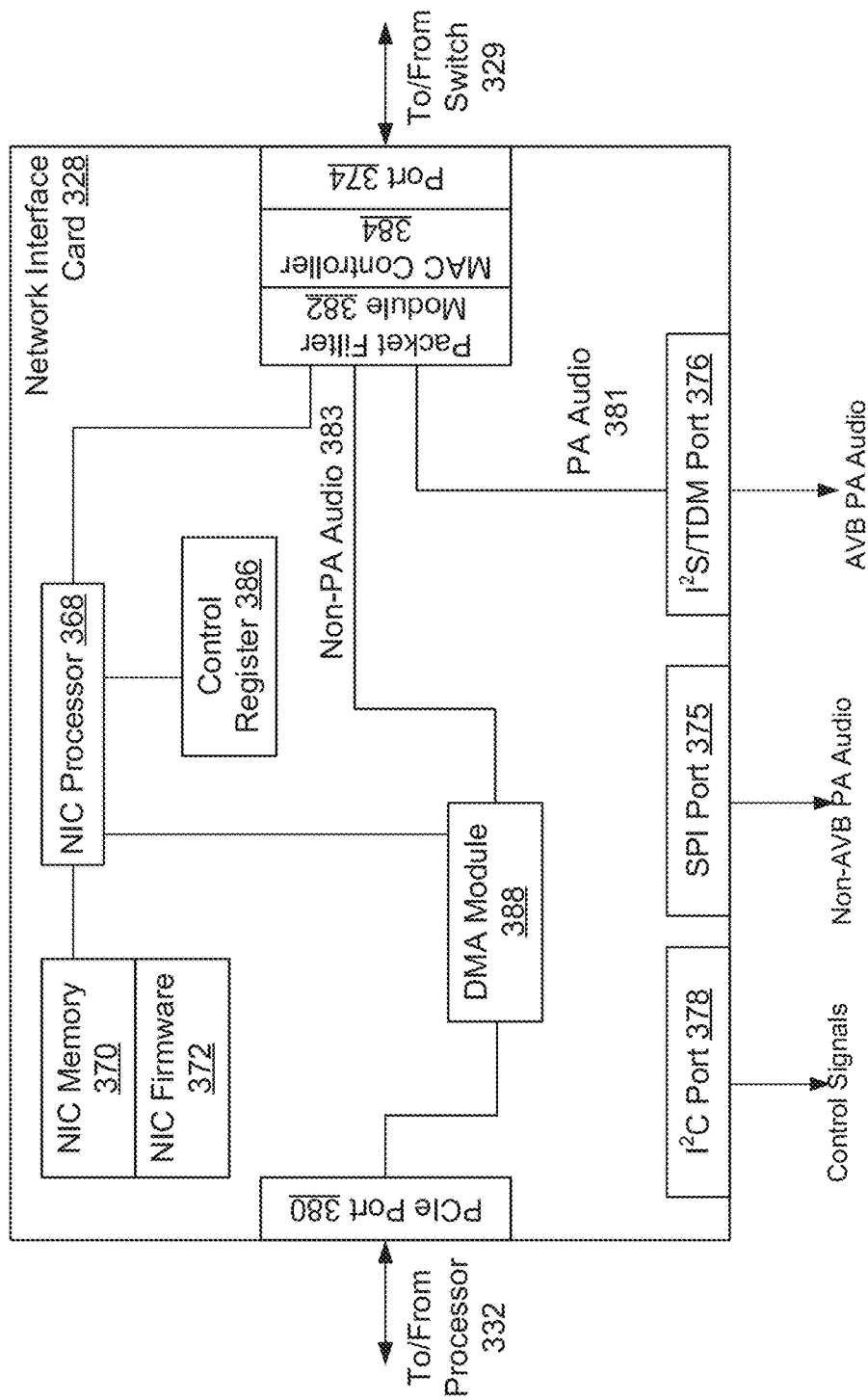
FIG. 3C shows a block diagram of a network interface card (NIC) for detecting and processing PAs on a transportation vehicle, according to one aspect of the present disclosure.

NIC 328:

FIG. 3C shows an example of NIC 328, configured to operate according to one aspect of the present disclosure for processing PA announcements. NIC 328 includes various ports, for example, 374, 375, 376, 378 and 380. It is noteworthy that NIC 328 may have fewer or more ports than the number of ports shown in FIG. 3C.

In one aspect, port 374 may be include a reduced media-independent interface (RGMII), a standard, IEEE defined interface used to connect to a media access control (MAC) conroller 384. The term media independent means that different types of PHY devices can be used for connecting to different media (e.g. twisted pair copper, fiber optic, and others) without redesigning or replacing the MAC hardware. The MAC controller 384 receives network packets, checks the MAC address and forwards valid packets to a hardware based, packet filter module 382, The packet filter module 382 identifies PA packets, extracts PA audio from the packet payload and routes the payload 381 to port 376. As described below, the packet filter module 382 inspects one or more fields in the network packets to identify the PA packets.

In one aspect, port 375 is used to transfer PA audio in non-AVB frames (for example, in RTP frames) directly to a Codec. RTP is a standard network protocol used to transport audio/video, Port 375 includes a Queued Serial Peripheral interface (QSPI) that is used to transfer data across a SPI bus, as described below in detail.

In one aspect, port 376 may be an I²S or TDM (time division multiplexed) port that transfers PA audio 381 received as AVB packets directly to Codec 362 or another component. TDM formats are typical used when more than two channels of data are to be transferred on a single data line.

In one aspect, port 378 may be an I²C port to interface with peripheral devices, for example, Codec 362. Port 376 may be used to transmit control signals for volume control to Codec 362, as described below in more detail.

In yet another aspect, port 380 includes logic and circuitry to enable a PCI-Express connection between processor 332 and NIC 328 via a PCI-Express link. Port 380 is used by NIC 328 to transfer non-public announcement audio/video 383 to processor 332 via a direct memory access (DMA) operation. The DMA operations are controlled by a DMA module 388. The DMA module 388 has a plurality of channels that are setup by a NIC processor 368 to transfer non-PA audio packets 383 to memory 340 of seat device 326.

In one aspect, NIC processor 368 executes firmware instructions 372 out of NIC memory 370 to control the overall operations of NIC 328. NIC processor 368 uses one or more control registers 386 to store configuration information for operating NIC 328.

Processor 368 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

NIC processor 368 may also be used to process non-AVB PA packets, for example, an Ethernet frame with a RIP payload. Details of operating NIC 328 are provided below.

Figure 3D:
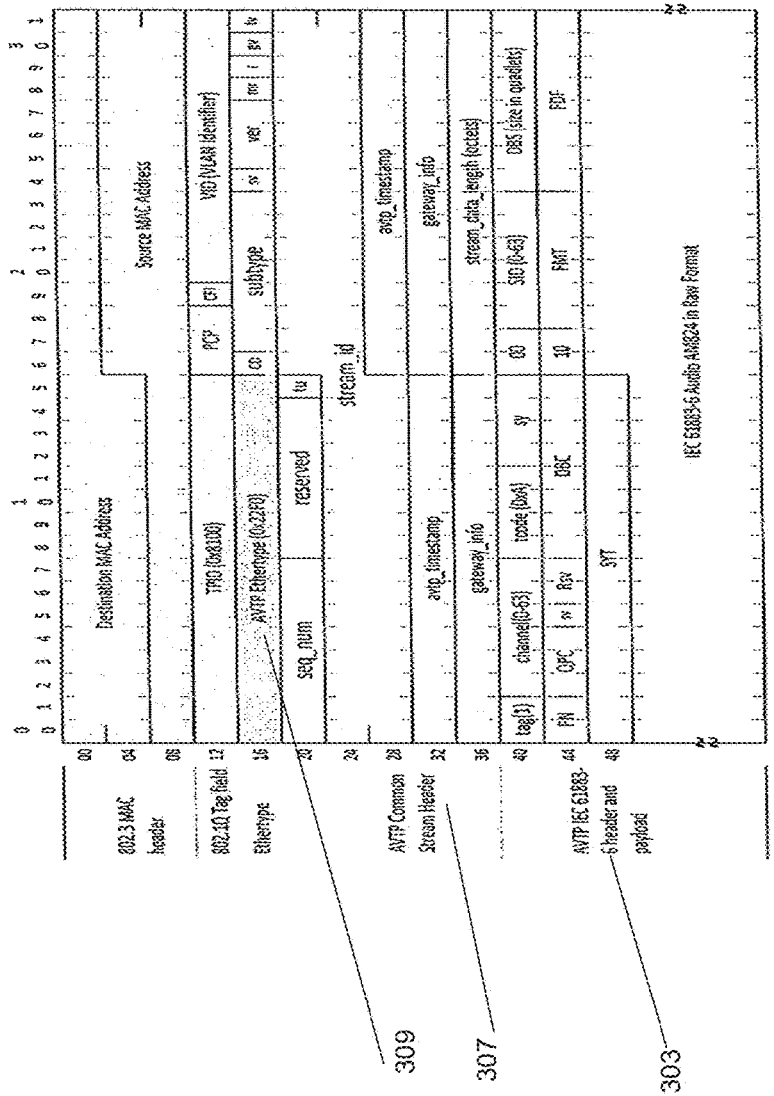
FIG. 3D shows an example of an Ethernet frame with an AVB (Audio-Video Bridging) payload, used according to one aspect of the present disclosure.

AVB Packet Format:

FIG. 3D shows an example of a standard AVB audio stream packet format 301, used according to one aspect of the present disclosure. The AVB format 301 is based on IEEE standards developed to build networks capable of transporting time sensitive audio and/or video data streams. These standards are used in avionics and automotive, professional audio, and other applications where low latency and/or time critical signal delivery are important factors. Format 301 includes standard Ethernet fields, e.g. a destination MAC address, source MAC address, a ULAN identifier and others that are used in Ethernet frames. For brevity sake, these fields are not described in detail. The Ether type field (shown as 309) is used to identify an AVB packet with an AVB payload 303 and AVB header 307. The header 307 includes a stream identifier (stream ID) that identifies an AVB stream. The stream_ID may be used to identify a PA by NIC 328. The header 307 also includes a timestamp both at the destination and the source indicating when the AVB payload was sent and received.

RTP Format:

FIG. 3E shows an example of a standard RIP packet header 311 with a payload (shown as PT). The PA audio may be received by NIC 328 as RIP payload and processed by the NIC 328. The non-AVB PA audio is transferred to Codec 362 via port 375, as described below in detail.

Figure 4A:
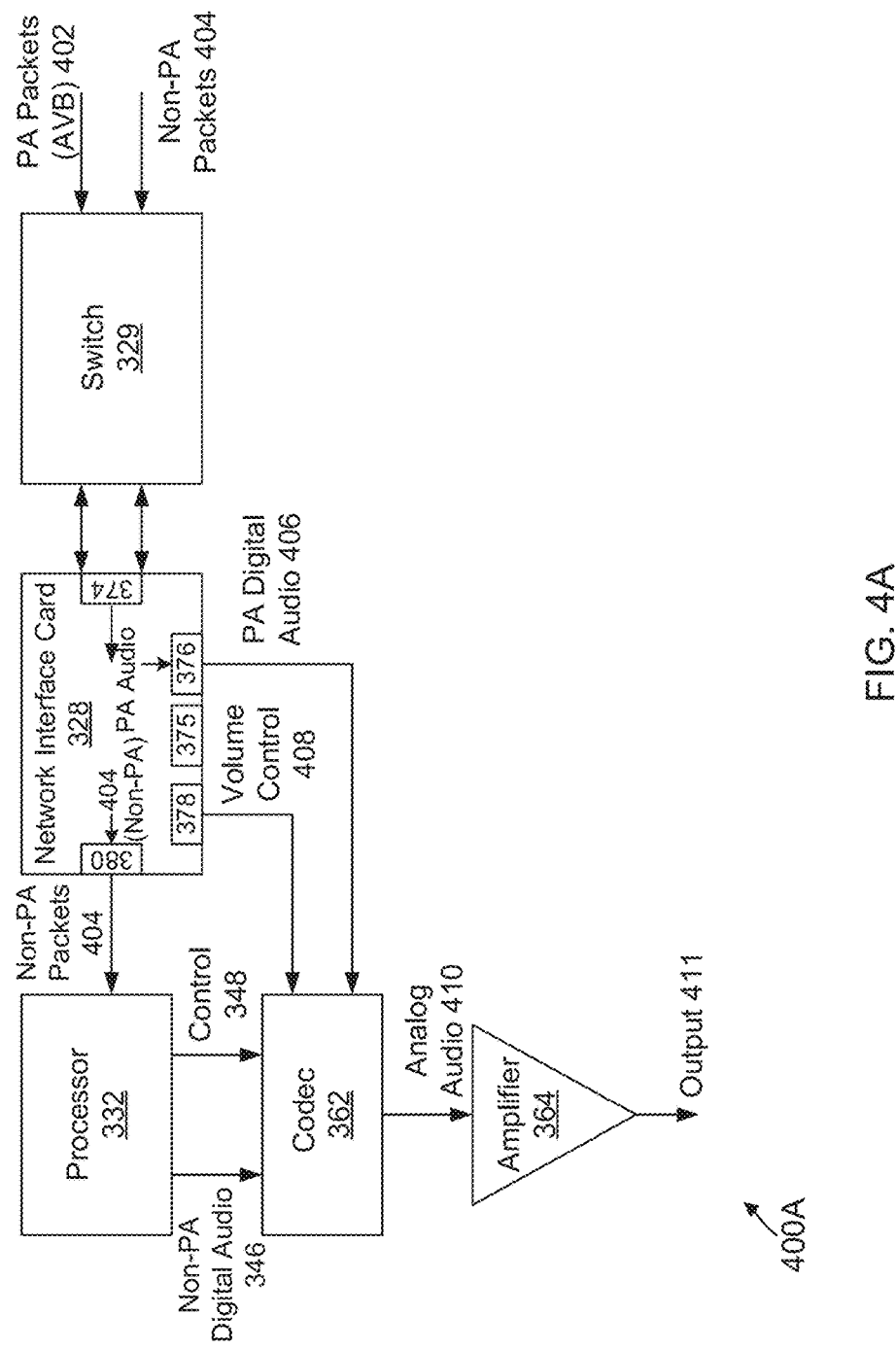
FIGS. 4A-4D show examples of various systems where a NIC processes PA packets bypassing a seat device processor, according to various aspects of the present disclosure.

Systems 400A-400D:

FIG. 4A shows an example of a system 400A for processing PA announcements by NIC 328, bypassing processor 332 processing, according to one aspect of the present disclosure. NIC 328 receives PA packets 402 and non-PA packets 404 via switch 329. The PA packets 402 are generated by server 345 and in one aspect, are configured in the AVB format shown in FIG. 3D. The packet filter module 382 of NIC 328 identifies the PA packets based on a stream_ID for packets 402. If there is a stream_ID match, then the audio payload from PA packets 402 is extracted and forwarded as digital audio 406 to Codec 362 via port 376. A control signal 408 is also generated by NIC 328 and is sent to Codec 362 via port 378. The control signal 408 is used to control the volume of the PA audio. The Codec 362 generates analog audio 410 and provides it to the amplifier 364. The amplifier 364 provides an output 411 that is made available to an audio jack for playback.

The non-PA packets 404 are routed to the processor 332 by the DMA module 388. The processor 332 pre-processes the packets, extracts the audio from packets 404. The digital audio 346 and control signal 348 are then provided to Codec 362. The digital audio 346 is converted to analog audio and then provided to the amplifier 364. The analog, non-PA audio is played after the PA audio 411 has been played. If the non-PA audio is being played, before the PA audio, then the non-PA audio playback is halted to play the PA audio. FIG. 4A shows the processor 332 having direct control over the shared Codec 362. In an alternative aspect, the processor of the NIC 328 may act as a "gatekeeper" (controller) for audio settings. This furthers DAL-D compliance by ensuring the processor 332 cannot "break" the Codec 362 (cause a malfunction) via inappropriate settings. As described later in connection with FIG. 7A, this is provided for in system 700A via a DAC/CODEC Settings Arbitrator 720 and again in systems 700B and 700C via the same arrangement (see FIGS. 7B and 7C). Returning to FIG. 4a, the process for using the system of FIG. 4A is described below with respect to FIG. 5A.

Figure 4B:
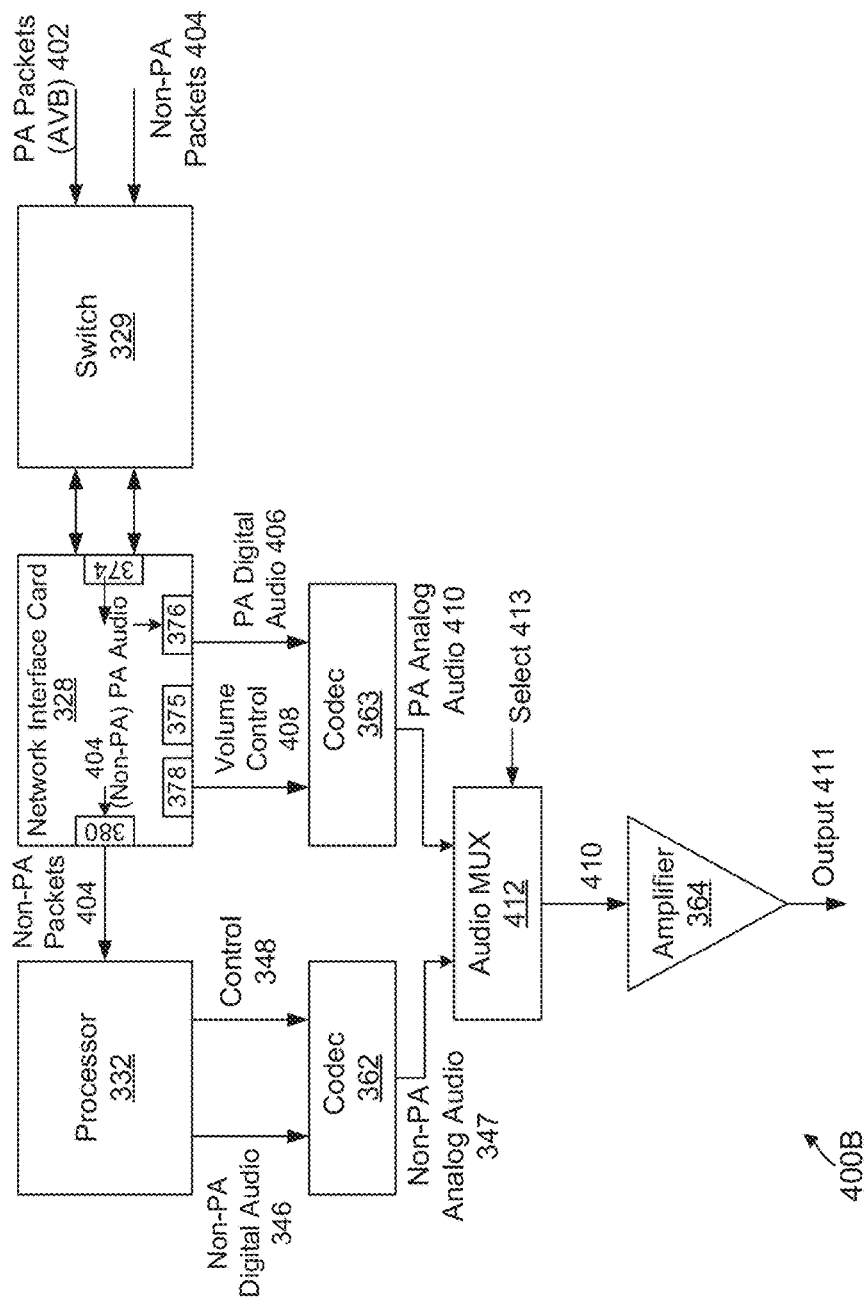

FIG. 4B shows a system 400B similar to FIG. 4A, except that system 400B includes an additional Codec 363 that receives digital audio 406 from port 376. Codec 363 generates the analog audio 410 that is provided to an audio multiplexer 412. The audio multiplexer 412 selects between analog non-PA audio 347 from Codec 362 and the analog PA audio 410 based on a select signal 413 from NIC 328. The audio Mux 412 provides the analog PA audio 410 to amplifier 364 that generates an output 411. Output 411 is then played using an audio jack. The process for using the system of FIG. 4B is described below with respect to FIG. 5B.

Figure 4C:
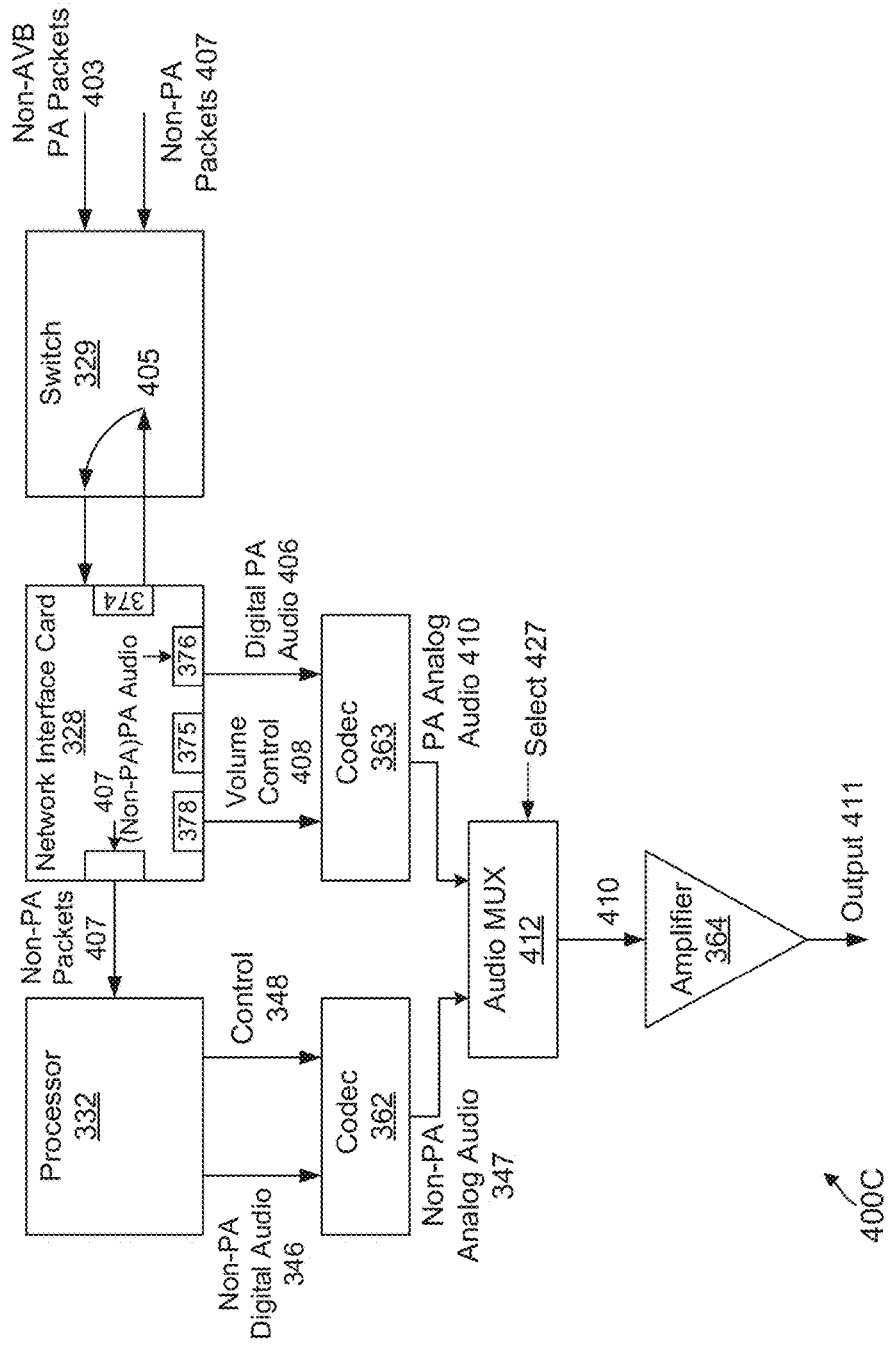

FIG. 4C shows an example of a system 400C for processing Non-AVB PA packets 403 and non-PA packets 407, according to one aspect of the present disclosure. The non-PA packets 407 are routed to processor 332, as described above with respect to FIGS. 4A and 4B. PA packets 403 after being pre-processed by the packet filter module 382 are provided to the NIC processor 368. The NIC processor 368 extracts the audio in packets 403 and generates AVB packets 405 with the PA audio. The AVB packets 405 generated by NIC processor 368 are routed back to switch 329 via port 374. The switch 329 then re-routes the AVB PA packets 405 to NIC 328. There are two methods of re-routing through the switch. The first is to use a ternary content addressable memory (TCAM) function inside the switch to redirect the packet. The second may be employed if the switch 329 does not include a TCAM function. In this method, the switch re-routes using a switch spare port set up for looping back. The packet filter module 382 identifies the AVB PA packets 405 and routes the digital audio 406 to Codec 363. Codec 363 generates the analog audio 410 that is provided to the audio multiplexer 412. The audio multiplexer 412 selects between analog non-PA audio 347 from Codec 362 and the analog PA audio 410 based on a select signal 427 from NIC 328. The audio Mux 412 provides the analog PA audio 410 to amplifier 364 that generates an output 411. Output 411 is then played using an audio jack. The process for using system 400C is described below with respect to FIG. 5C.

Figure 4D:
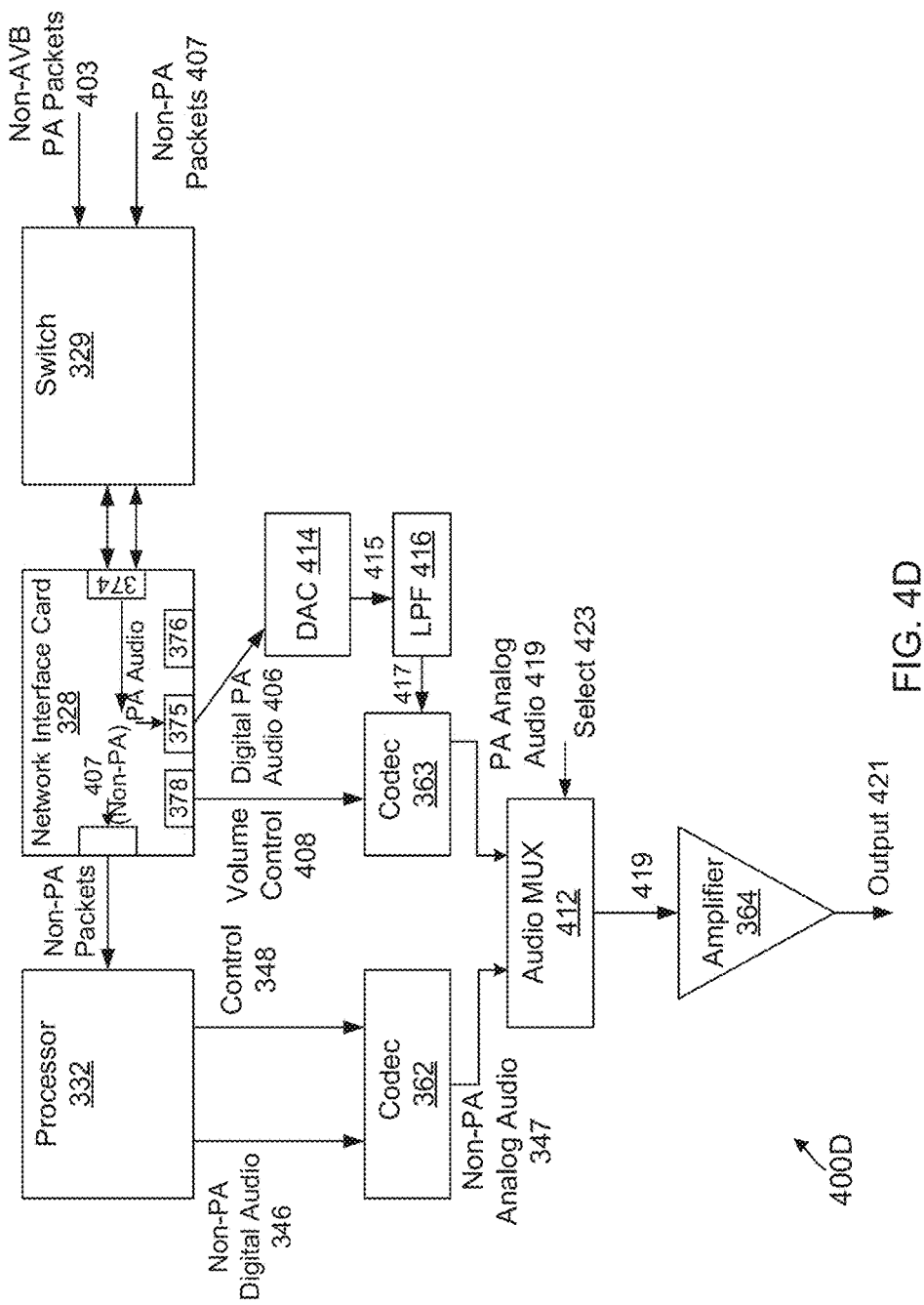

FIG. 4D shows a system 400D that processes non-AVB PA packets 403 and non-PA packets 407 without re-routing the PA packets to switch 329, according to one aspect of the present disclosure. In system 400D, after the PA packets are detected, the packets are routed to NIC processor 332. The NIC processor 332 extracts the audio and transfers the digital PA audio 406 to digital to analog converter (DAC) 414 via port 375. The DAC 414 generates an analog output 415 for a low pass filter (LPF) 416. An output 417 from LPF 416 is then input to the Codec 363 that also receives the control signal 408, similar to the system 400C in FIG. 4C.

Codec 363 generates a PA analog audio 419 that is provided to the audio Mux 412. The audio mux 412 selects the analog PA audio 419 based on a select signal 423 generated by NIC 328. The PA analog audio 419 is provided to the amplifier 364 that generates an output 421 that is played using an audio jack.

Figure 5A:
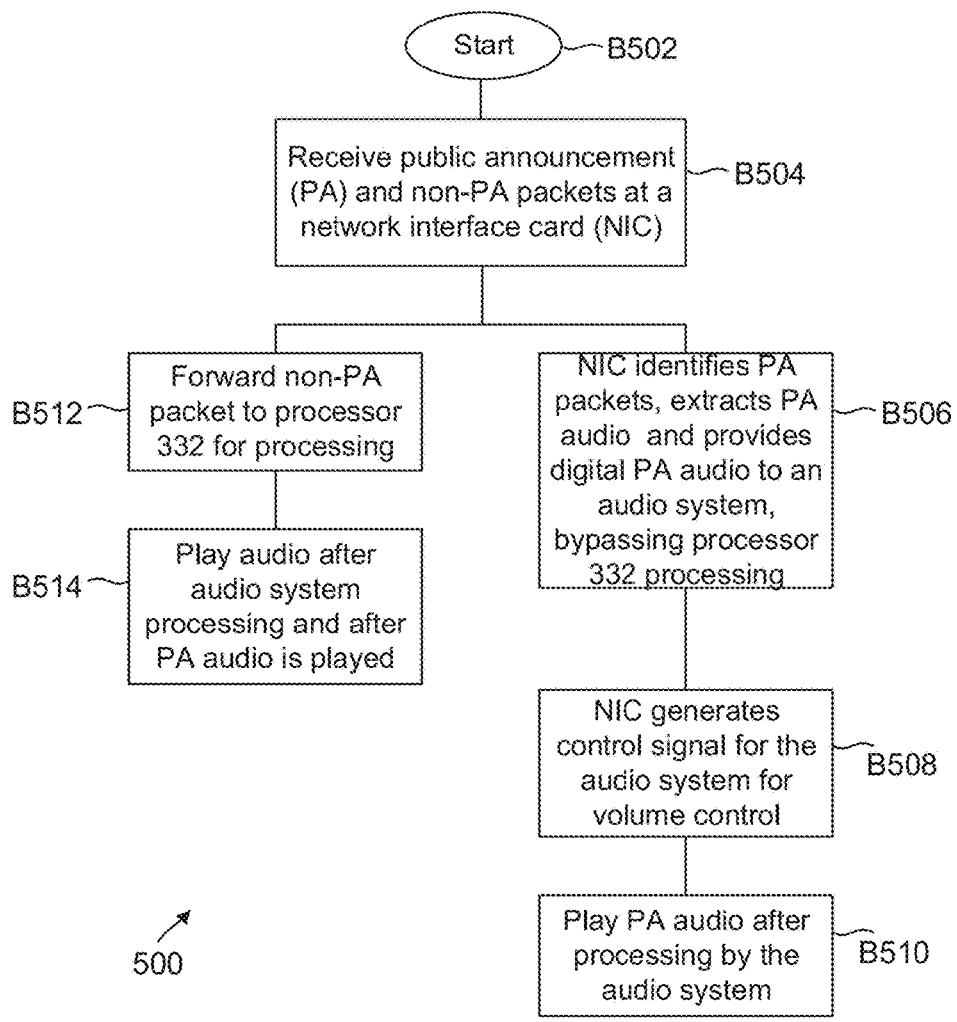
FIGS. 5A-5D show examples of process flows where a NIC processes PA packets bypassing a seat device processor, according to various aspects of the present disclosure.

Process Flows:

FIG. 5A shows a process 500 for using system 400A, described above with respect to FIG. 4A. The process begins in block B502, when server 345 and the seat device 326 are initialized and operational. Processor 346 of server 345, executing instructions out of memory 350, generates a PA announcement. The PA announcement may be in the AVB format, where the audio payload is encapsulated in an Ethernet frame. The processor 346 may also generate non-PA packets 404, for example, entertainment audio/video packets. In block B504, the PA packets 402 and the non-PA packets are received by NIC 328.

In block B506, the packet filter module 382 identifies the PA packets 402 based on the stream_ID. The packet filter module 382 may store or have access to stream_IDs that indicate a PA announcement. In one aspect, the packet filter module 382 may use the hardware comparator for identifying the PA packets. Once the PA packets are identified, the digital audio 406 is extracted by NIC 328 and transferred to Codec 362 via port 376. The Codec 362 is part of an audio system with the amplifier 364. It is noteworthy that block B506 bypasses processor 332.

In block B508, the NIC 328 also generates a control signal 408 for volume control. Codec 362 converts the digital audio 406 to analog audio 410 that is provided to the amplifier 364. The amplifier 364 generates an output 411 that is played in block B510 via an audio jack.

In block B512, the packet filter module 382 identifies the non-PA packets and using a DMA operation, transfers the packets to processor 332 of the seat device 326. Processor 326 then extracts the non-PA digital audio 346 and sends it to Codec 362 with the control signal 348. In block B514, the digital non-PA audio 346 is converted to analog non-PA audio and provided to the amplifier 364. The non-PA audio from the amplifier 364 is then played after the PA audio is played. It is noteworthy that playback of non-PA audio is interrupted for PA audio, if the PA audio is received after the non-PA audio. Depending on the design of the IFE layer 334, the PA audio can also preclude non-PA audio from starting in the first place by "pausing" the user interface while the PA audio is in progress, i.e., temporarily stopping playback of non-PA media. Moreover, if the IFE Layer 334 does not pause the user interface, any existing audio will be overridden by the PA audio. This is noteworthy as PA and non-PA traffic are functionally independent so the timing of one versus the other does not matter.

Figure 5B:
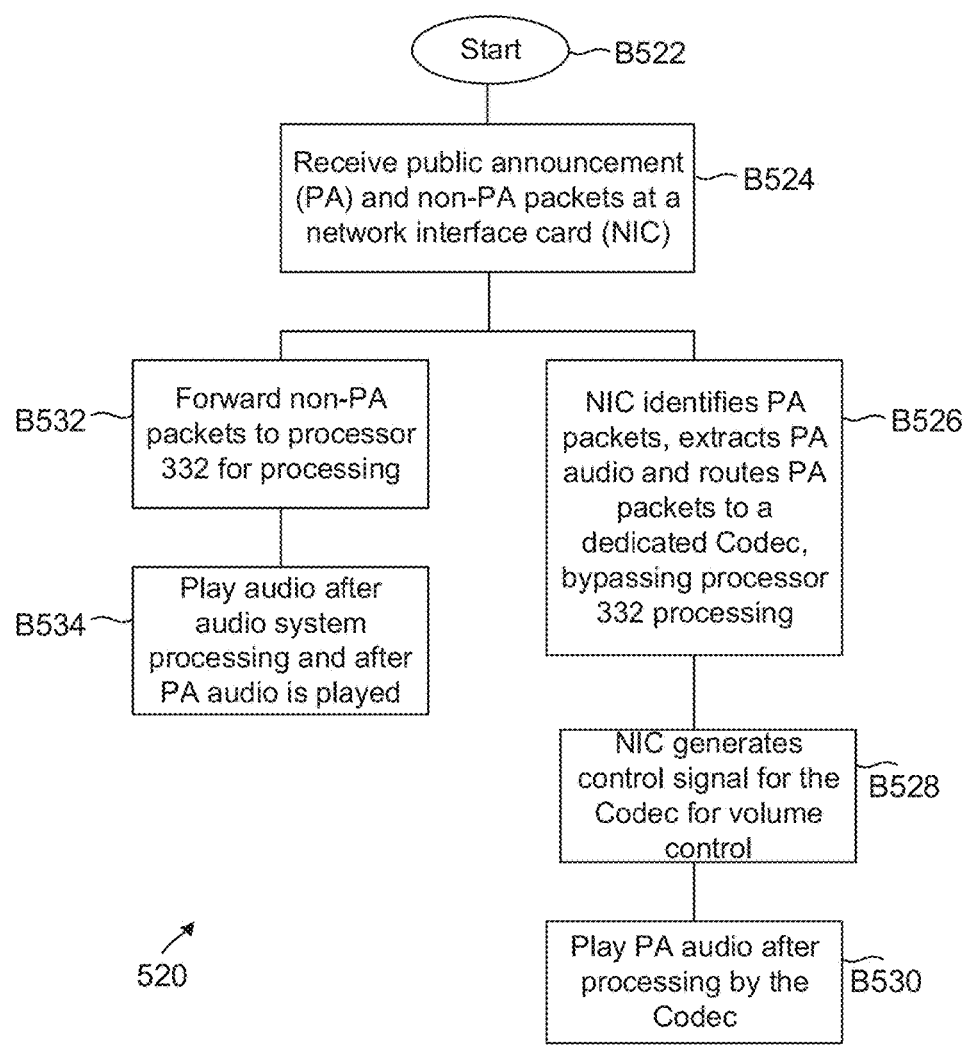

FIG. 5B shows a process 520 for using system 400B, described above with respect to FIG. 4B. The process begins in block B522, when server 345 and the seat device 326 are initialized and operational. Processor 346 of server 345, executing instructions out of memory 350, generates a PA announcement. The PA announcement may be in the AVB format, where the audio payload is encapsulated in an Ethernet frame. The processor 346 may also generate non-PA packets (404), for example, entertainment audio/video packets.

In block B524, the PA packets 402 and the non-PA packets are received by NIC 328.

In block B526, the packet filter module 382 identifies the PA packets 402 based on the stream_ID. The packet filter module 382 may store or have access to stream_IDs that indicate a PA announcement. In one aspect, the packet filter module 382 may use the hardware comparator for identifying the PA packets. Once the PA packets are identified, the digital audio 406 is extracted and transferred to Codec 363 via port 376, bypassing processor 332.

In block B528, the NIC 328 generates a control signal 408 for volume control. The control signal 408 is sent to Codec 363 via port 378. Codec 363 converts the digital audio 408 to analog audio 410 that is provided to the audio Mux 412. The audio Mux 412 selects the PA audio 410 based on the select signal 413 and provides analog audio 410 to the amplifier 364. The amplifier 364 generates an output 411 that is played in block B530.

In block B532, the packet filter module 382 identifies the non-PA packets and using a DMA operation, transfers the packets to processor 332 of the seat device 326. Processor 326 extracts the digital non-PA audio and transfers the digital non-PA audio 346 to Codec 362 with a control signal 348. In block B534, the digital non-PA audio is converted to analog non-PA audio 347 and provided to the amplifier 364 via the audio Mux 412. The non-PA audio is then played after the PA audio is played. It is noteworthy that playback of non-PA audio is interrupted for PA audio, if the PA audio is received after the non-PA audio. Depending on the design of the IFE layer 334, the PA audio can also preclude non-PA audio from starting in the first place by "pausing" the user interface while the PA audio is in progress, i.e., temporarily stopping playback of non-PA media. Further, if the IFE Layer 334 does not pause the user interface, any existing audio will be overridden by the PA audio. This is noteworthy as PA and non-PA traffic are functionally independent so the timing of one versus the other does not matter.

Figure 5C:
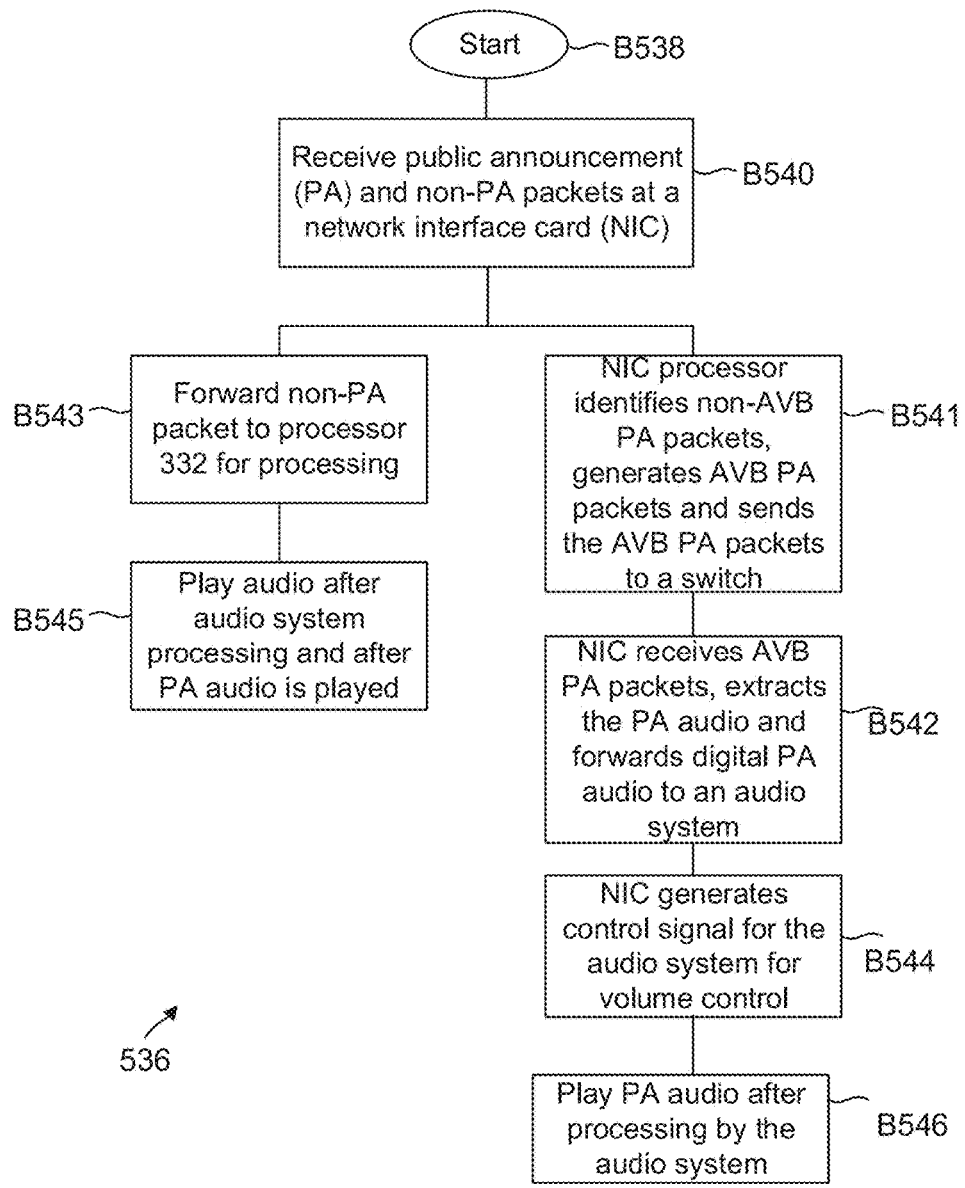

FIG. 5C shows a process 536 using system 400C, described above with respect to FIG. 4C. The process begins in block B538, when server 345 and the seat device 326 are initialized and operational. Processor 346 of server 345, executing instructions out of memory 350, generates a PA announcement 403. The PA announcement may be in an RTP format, where the audio payload is part of a network frame, e.g. an Ethernet frame. The processor 346 may also generate non-PA packets (407), for example, entertainment audio/video packets.

In block B540, the PA packets 403 and the non-PA packets 407 are received by NIC 328.

In block B541, the NIC 328 identifies the PA packets 403. The PA packets may be identified based on a MAC address, a multicast bit setting or any other identifying information. The PA packets 407 are provided to NIC processor 368. The NIC processor 368 executing firmware instructions extracts the audio for PA packets 403 and generates AVB packets 405 with the digital PA audio. The AVB packets 405 are routed to switch 329. In one aspect, the switch 329 may use a ternary content addressable memory (TCAM) for identifying the PA packets for routed back to NIC 328. The switch 329 then sends the PA AVB packets 405 back to NIC 328.

In block B542, the packet filter module 382 identifies the AVB PA packets 405 based on a stream_ID. The packet filter module 382 may store or have access to stream_IDs that indicate a PA announcement. In one aspect, the packet filter module 382 may use the hardware comparator for identifying the PA packets. Once the PA packets are identified, the digital PA audio 406 is extracted and transferred to Codec 363 via port 376.

In block B544, the NIC 328 generates a control signal 408 for volume control. The control signal 408 is transmitted to Codec 363 via port 378. Codec 363 converts the digital audio 408 to analog audio 410 that is provided to the audio Mux 412. The audio Mux 412 selects the PA audio 410 based on the select signal 427 generated by NIC 328. The analog PA audio 410 is provided to the amplifier 364. The amplifier 364 generates an output 411 that is played in block B546.

In block B543, the packet filter module 382 identifies the non-PA packets 407 and using a DMA operation, transfers packets 407 to processor 332 of the seat device 326. Processor 326 extracts the audio from the non-PA packets and transfers the digital non-PA audio 346 to Codec 362 with a control signal 348. In block B545, the digital non-PA audio 346 is converted to analog audio 347 and provided to the audio Mux 412. The audio Mux 412 selects the analog audio 347 after the PA audio 410 has been played. The analog audio 347 is provided to the amplifier 364 that generates a non-PA audio. The non-PA audio is then played after the PA audio. It is noteworthy that playback of non-PA audio is interrupted for PA audio, if the PA audio is received after the non-PA audio. Depending on the design of the IFE layer 334, the PA audio can also preclude non-PA audio from starting in the first place by "pausing" the user interface while the PA audio is in progress, i.e., temporarily stopping playback of non-PA media. Additionally, if the IFE Layer 334 does not pause the user interface, any existing audio will be overridden by the PA audio. This is noteworthy as PA and non-PA traffic are functionally independent so the timing of one versus the other does not matter.

Figure 5D:
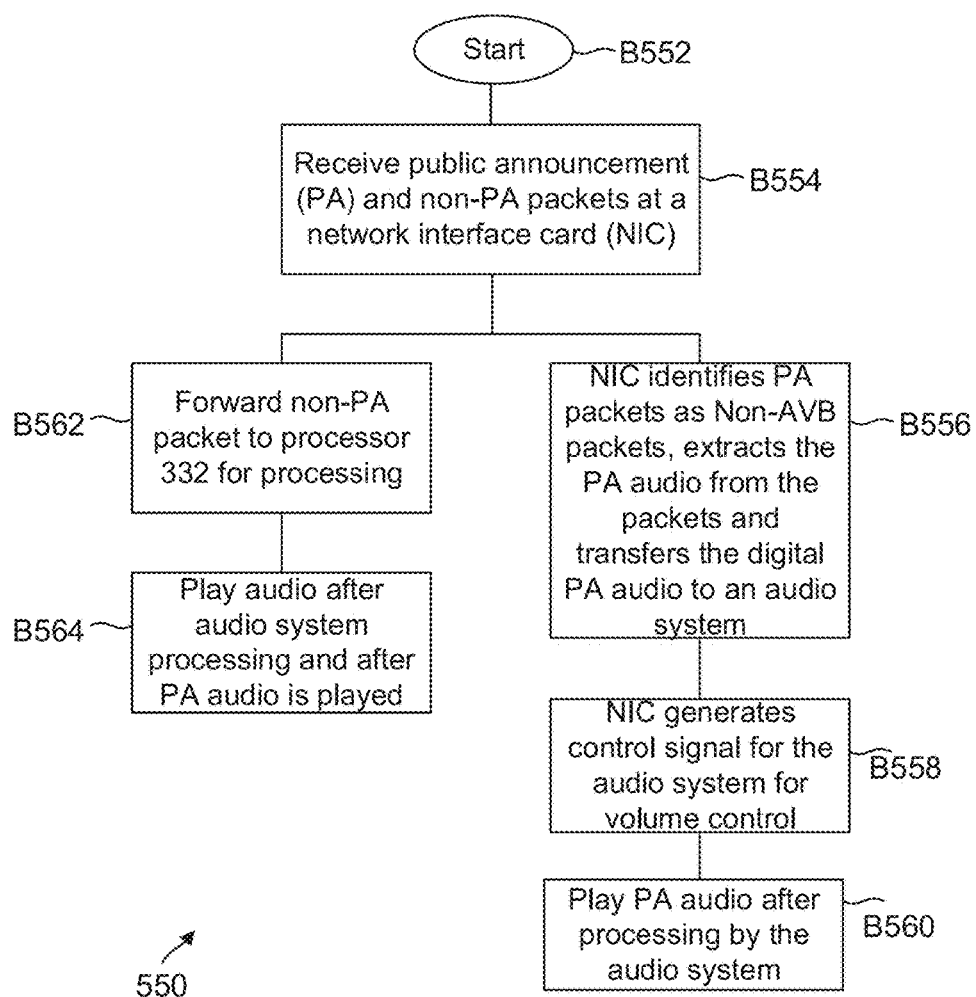

FIG. 5D shows a process 550 using system 400D, described above with respect to FIG. 4D. The process begins in block B552, when server 345 and the seat device 326 are initialized and operational. Processor 346 of server 345, executing instructions out of memory 350, generates a PA announcement. The PA announcement may be in a RTP format, where the audio payload is encapsulated in Ethernet frames 403. The processor 346 may also generate non-PA packets (407), for example, entertainment audio/video packets.

In block B554, the PA packets 403 and the non-PA packets 407 are received by NIC 328.

In block B556, the NIC 328 identifies the PA packets 403. The PA packets may be identified based on a MAC address, a multicast bit setting or any other identifying information. The PA packets are provided to NIC processor 328. The NIC processor 368 executing firmware instructions extracts the audio from PA packets 403 and forwards the digital PA audio 406 to the DAC 414 via port 375.

In block B558, the NIC 328 also generates a control signal 408 for volume control that is provided to Codec 363 via port 378. In block B560, an output 415 from DAC 414 is passed through LPF 416. An output 417 from LPF 416 is provided to Codec 363. Codec 363 then outputs analog audio 419 which is provided to the audio Mux 412. The audio Mux 412 selects the PA audio 419 based on a select signal 423 generated by NIC 328 and provides the audio 419 to the amplifier 364. The amplifier 364 generates an output 421 that is played using an audio jack or other means.

In block B562, the packet filter module 382 identifies the non-PA packets 407 and using a DMA operation, transfers packets 407 to processor 332 of the seat device 326. Processor 326 extracts the non-PA audio from packets 407 and transfers the digital audio 346 to Codec 362 with the control signal 348. The Codec 362 generates non-PA, analog audio 347 that is provided to the audio Mux 412. In block B564, the amplifier 364 generates analog, non-PA audio that is played after the PA audio. It is noteworthy that playback of non-PA audio is interrupted for PA audio, if the PA audio is received after the non-PA audio. Depending on the design of the IFE layer 334, the PA audio can also preclude non-PA audio from starting in the first place by "pausing" the user interface while the PA audio is in progress, i.e., temporarily stopping playback of non-PA media. Moreover, if the IFE Layer 334 does not pause the user interface, any existing audio will be overridden by the PA audio. This is noteworthy as PA and non-PA traffic are functionally independent so the timing of one versus the other does not matter.

In one aspect, methods and systems for a transportation vehicle are provided. One method includes receiving a network packet at a network interface device of an information system of a transportation vehicle; identifying a public announcement audio in a payload of the network packet by the network interface device; extracting the public announcement audio from the payload of the network packet by the network interface device; transferring the public announcement audio to an audio system by the network interface device; and playing the public announcement audio by the audio system.

In another aspect, a method includes extracting a public announcement audio from a payload of a network packet received by a network interface device of a seat device interfacing with an in-flight entertainment system of an aircraft; transferring the public announcement audio directly to an audio system by the network interface device; processing the public announcement audio by the audio system to convert the public announcement audio from a digital version to an analog version; and playing the public announcement audio by the audio system.

In yet another aspect, a system is provided. The system includes a seat device of a transportation vehicle having a processor coupled to a memory and to a network interface device. The network interface device is configured to: receive a network packet; identify a public announcement audio in a payload of the network packet; extract the public announcement audio from the payload of the network packet; and transfer the public announcement audio to an audio system. The audio system then plays the public announcement.

Figure 7A:
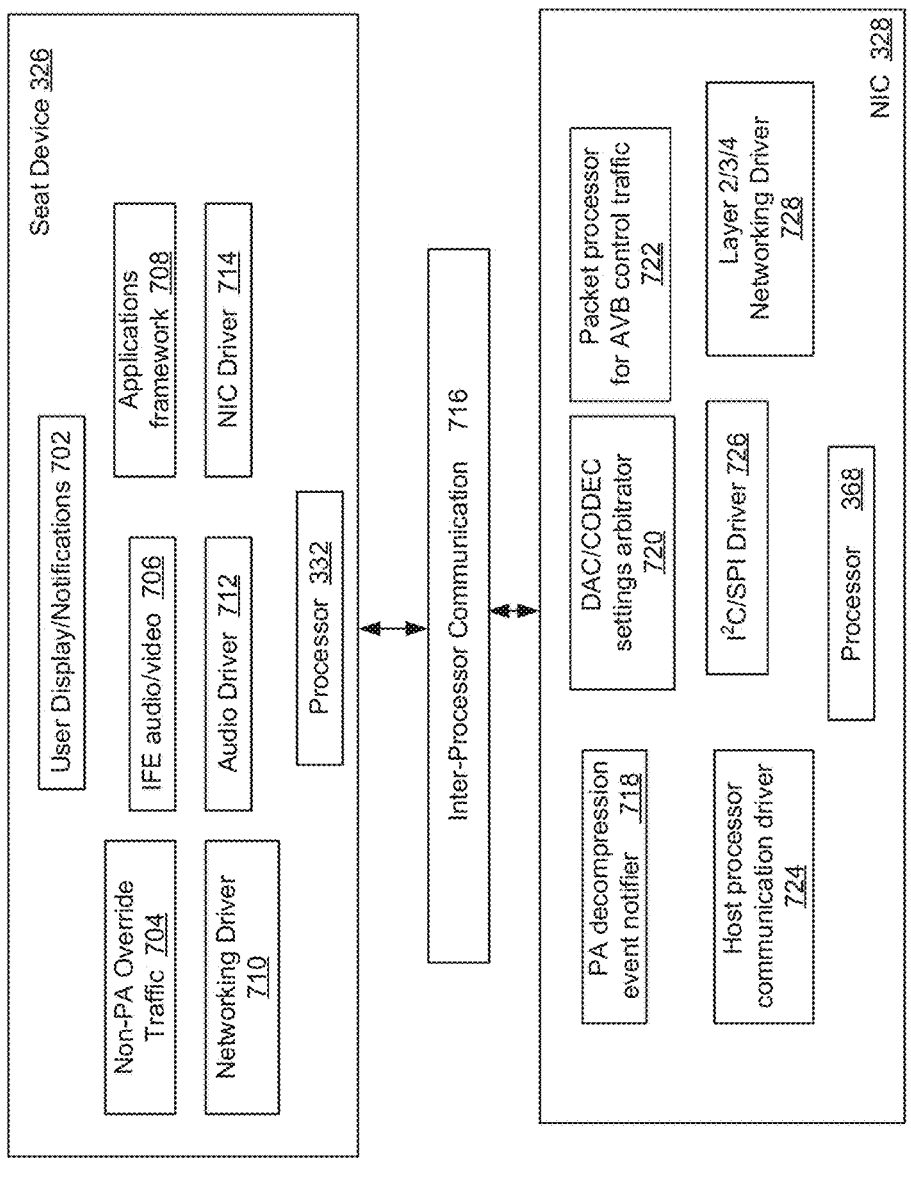
FIGS. 7A-7C show software architectural blocks diagrams for implementing the various aspects of the present disclosure.

Software Architecture (700A-700C):

FIG. 7A shows the software architecture 700A for processing AVB packets using system 400A/400B (FIGS. 4A/4B/5A/5B), according to one aspect of the present disclosure. The architecture 700A includes a user display/notifications module 702 executed by processor 332 to display notifications. The architecture 700A includes non- PA override traffic 704 that overrides PA announcements over non-PA traffic. The IFE audio/video is handled by module 706 executed by processor 332. The application framework 708 is used by processor 332 to execute software applications. The software applications may be based on software design assurance level E.

Processor 332 also executes a networking driver 710 for handling network frames and a NIC driver 714 for communicating with NIC 328 using the inter-processor communication (IPC) protocol 716. Processor 332 also executes an audio driver 712 to interface with Codec 362.

NIC processor 368 executes a host processor communication driver 724 to interface with processor 332. A layer 2/3/4 networking driver 728 is executed by processor 368 to manage network frames. A DAC/Codec arbitrator 720 is used to generate the control signal 408. The PA decompression notifier 718 when applicable, notifies the processor 368 when a PA packet has been received. The AVB packets for PA audio are processed by packet processor 722.

Processor 368 also executes I$^2$C/SPI driver 726 to interface with ports 378/375, respectively.

Figure 7B:
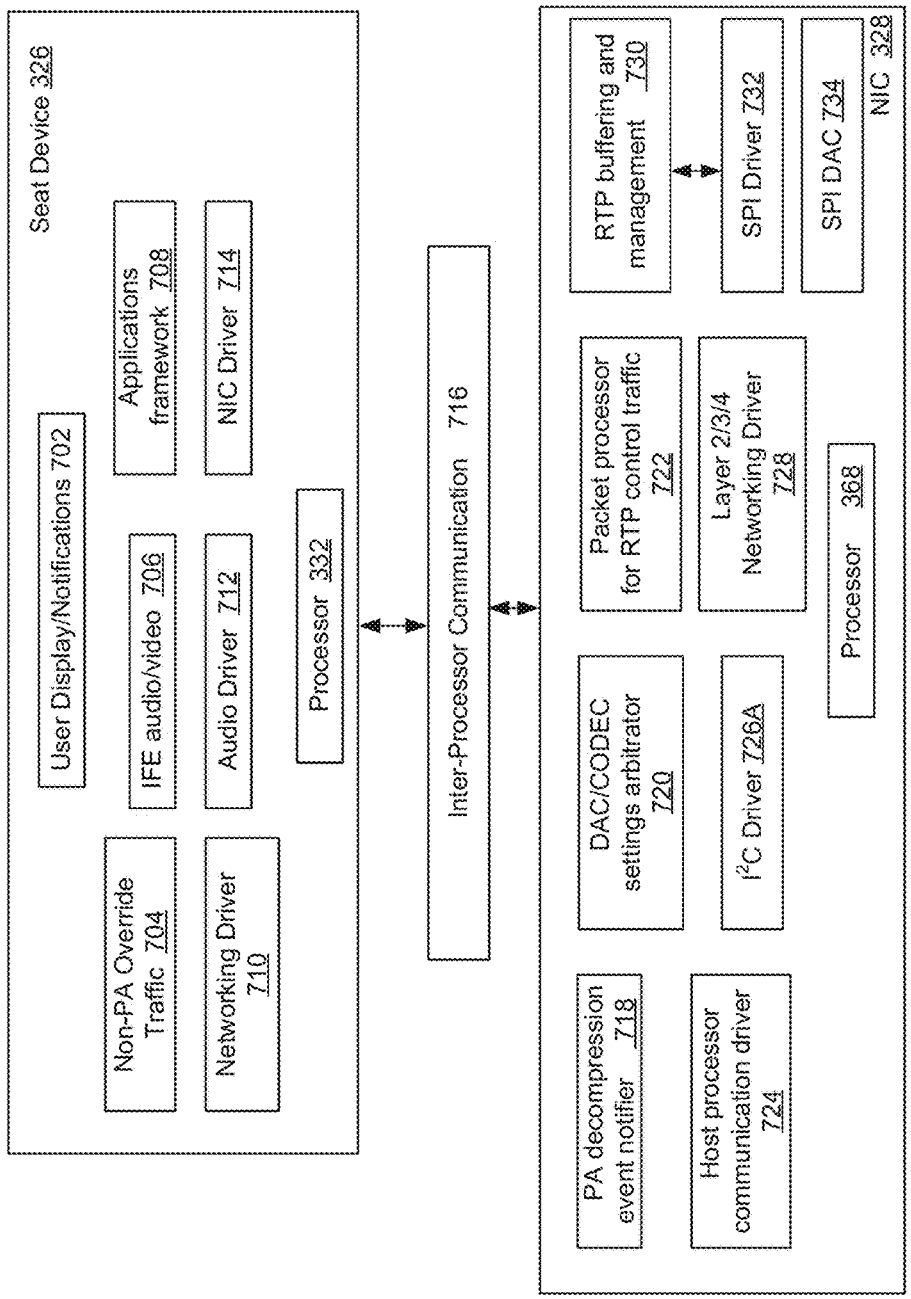

FIG. 7B shows the software architecture 700B for processing non-AVB packets using system 400D (FIGS. 4D/5D), according to one aspect of the present disclosure. FIGS. 7A and 7B have common components that perform similar functions. For brevity sake, those common components are not described again.

The architecture 700B buffers non-AVB packets using module 730. The non-AVB packets are pulled by SPI driver 732 that transfers the packets to a SPI DAC 734 (similar to DAC 414, FIG. 4D). It is noteworthy that FIG. 7B shows separate I$^2$C and SPI drivers, namely, 726A/732 for convenience.

Figure 7C:
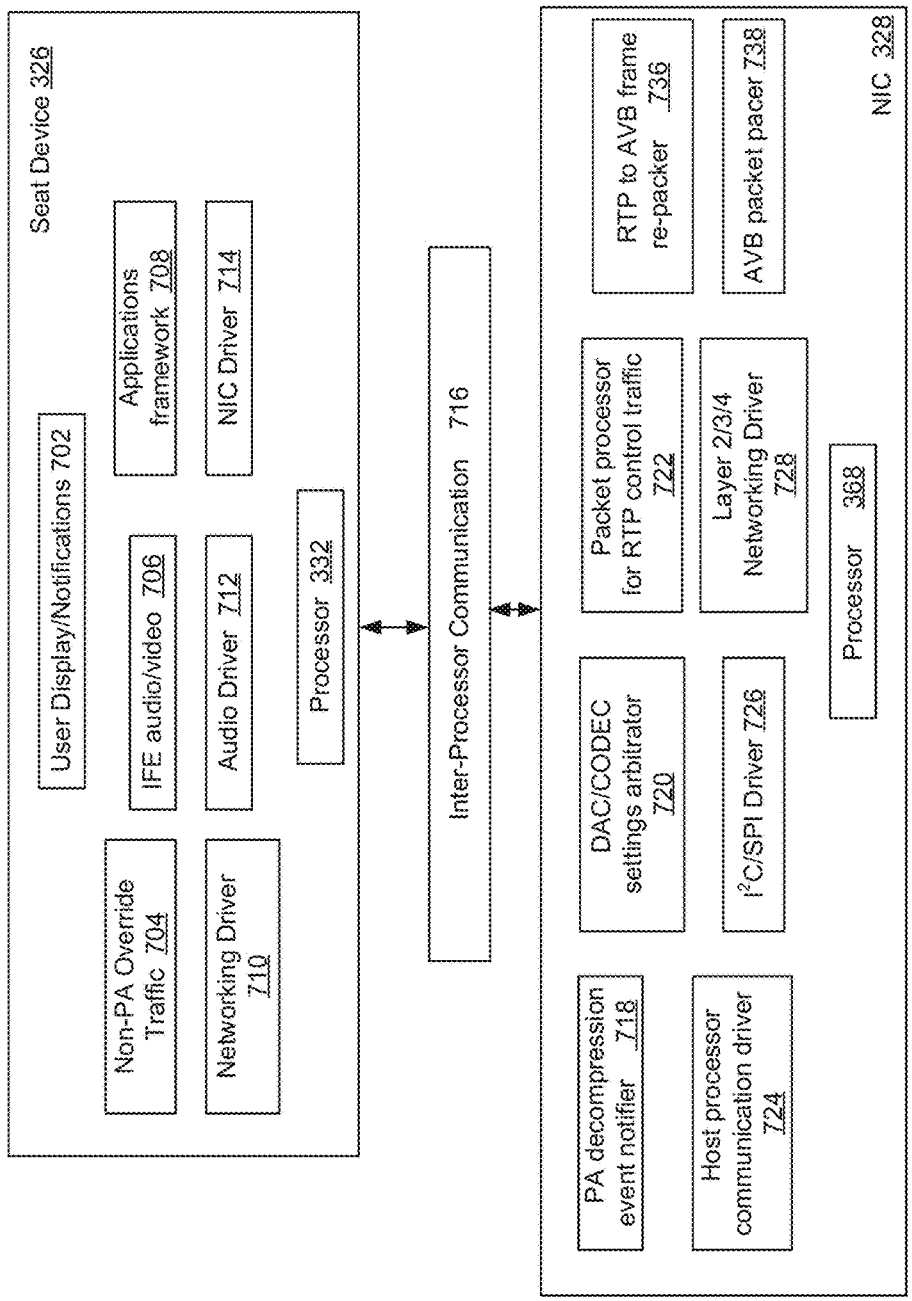

FIG. 7C shows the software architecture 700C for processing non-AVB packets using system 400C (FIG. 4C/FIG. 5C), according to one aspect of the present disclosure. FIGS. 7A and 7C have common components that perform similar functions. For brevity sake, those components are not described again.

The architecture 700C includes a RTP to AVB frame re-packer module 736 that extracts PA audio from a RTP frame and generates AVB packets. An AVB packet pacer 738 controls transferring the AVB packets to switch 329.

In one aspect, AVB and RTP based PA audio is processed entirely by NIC 328. The level E code executed by processor 332 does not interfere with PA audio processing that is processed with assurance level D.

Figure 8:
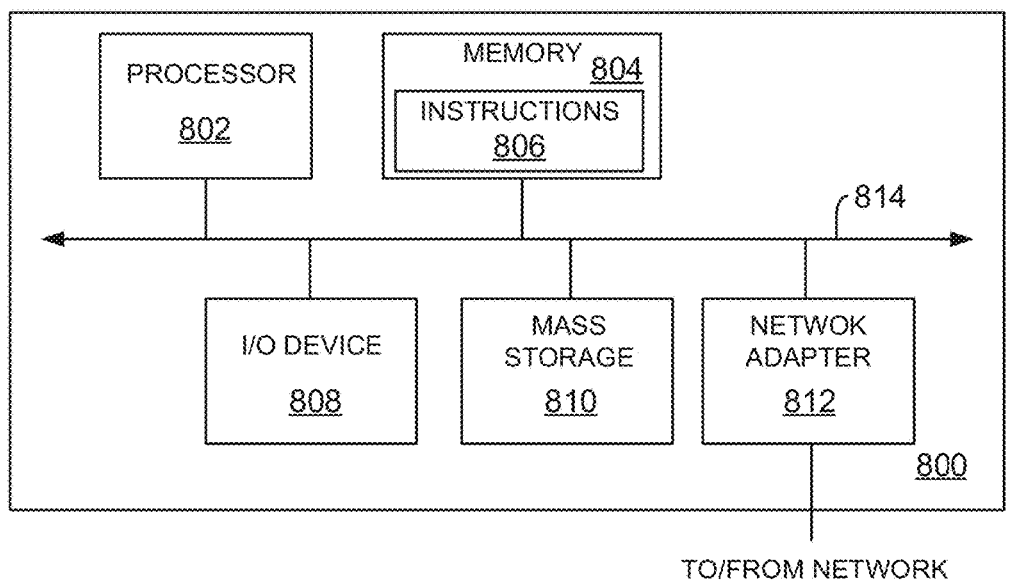
FIG. 8 shows a block diagram of a computing system, used according to one aspect of the present disclosure.

Processing System:

FIG. 8 is a high-level block diagram showing an example of the architecture of a processing system 800 that may be used according to one aspect. The processing system 800 can represent media server 112, computing system 106, onboard management system 344, seat device 326 or any user device that attempts to interface with a vehicle computing device. Note that certain standard and well-known components which are not germane to the present aspects are not shown in FIG. 8.

The processing system 800 includes one or more processor(s) 802 and memory 804, coupled to a bus system 814. The bus system 814 shown in FIG. 8 is an abstraction that represents any one or more separate physical buses and/or point-to-point connections, connected by appropriate bridges, adapters and/or controllers. The bus system 814, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 802 are the central processing units (CPUs) of the processing system 800 and, thus, control its overall operation. In certain aspects, the processors 802 accomplish this by executing software stored in memory 804. A processor 802 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 804 represents any form of random access memory (RAM), read-only memory (ROM), flash memory, or the like, or a combination of such devices. Memory 804 includes the main memory of the processing system 800. Instructions 806 may be used to implement the process steps of FIGS. 5A-5D described above.

Also connected to the processors 802 through the bus system 814 are one or more internal mass storage devices 810, and a network adapter 812. Internal mass storage devices 810 may be, or may include any conventional medium for storing large volumes of data in a non-volatile manner, such as one or more magnetic or optical based disks, flash memory, or solid-state drive.

The network adapter (or interface card) 812 provides the processing system 800 with the ability to communicate with remote devices (e.g., over a network) and may be, for example, an Ethernet adapter or the like.

The processing system 800 also includes one or more input/output (I/O) devices 608 coupled to the bus system 814. The I/O devices 808 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for processing public announcements at transportation vehicles meeting higher software design assurance level than other applications have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method for use on a transportation vehicle having an information processing system, the method comprising:
receiving a first network packet at a receiving port of a network interface device of a seat device of the information system at a seat of the transportation vehicle in which the first network packet includes a payload;

wherein the network interface device is coupled to a processor of the seat device by a peripheral link, and the seat device is configured to present audio and video content to a user;

identifying public announcement audio in the payload of the first network packet by the network interface device by evaluating an identifier included in the first network packet;

extracting the public announcement audio from the payload of the first network packet by the network interface device;

generating a first control signal for an audio system of the seat by the network interface device for controlling a volume of the audio system for playing the public announcement audio;

transferring the public announcement audio to the audio system, directly from the receiving port via a first port of the network interface device, bypassing the processor of the seat device;

playing the public announcement audio by the audio system using the first control signal;

identifying that a second network packet received by the network interface device includes non-public announcement audio;

providing the second network packet to the processor that transfers the non-public announcement audio to the audio system with a second control signal; and playing the non-public announcement audio by the audio system using the second control signal.

2. The method of claim 1, wherein payload of the second network packet is provided by the network interface device to the processor by a direct memory access operation.

3. The method of claim 1, wherein the first network packet is an Ethernet frame with an audio video bridging (AVB) payload having the public announcement audio.

4. The method of claim 1, wherein the public announcement audio is included in a real-time transport protocol (RTP) payload of the first network packet.

5. The method of claim 1, wherein the network interface device generates an audio video bridging (AVB) packet using the first network packet when the public announcement audio is not in an AVB format, and the generated AVB packet is re-routed to a switch interfacing with the network interface device.

6. The method of claim 5, wherein the re-routed AVB packet is sent to the net-work interface device by the switch and processed by the network interface device before being transferred directly to the audio system for playback.

7. The method of claim 1, wherein the transportation vehicle is one of a train, bus, ship and an aircraft.

8. A method for use with an in-flight entertainment system of an aircraft, the method comprising:

extracting public announcement audio from a payload of a first network packet received by a network interface device coupled by a peripheral link to a processor of a seat device inter-facing with the in-flight entertainment system of the aircraft; wherein the network interface de-vice identifies the public announcement packet based on an identifier included in the first net-work packet;

transferring the public announcement audio directly to an audio system by the network interface device from a port of the network interface device, bypassing the processor of the seat device; wherein the network interface device provides a first control signal to the audio system for controlling a volume of the public announcement audio;

processing the public announcement audio by the audio system to convert the public announcement audio from a digital version to an analog version;

playing the public announcement audio by the audio system using the first control signal;

transferring by the network interface device, a second network packet with non-public announcement audio to the processor; wherein the processor provides the non-public announcement audio to the audio system with a second control signal; and playing the non-public announcement audio by the audio system using the second control signal.

9. The method of claim 8, wherein payload of the second network packet is provided by the network interface device to the processor by a direct memory access operation.

10. The method of claim 8, wherein the first network packet is an Ethernet frame with an audio video bridging (AVB) payload having the public announcement video.

11. The method of claim 8, wherein the public announcement audio is included in a real-time transport protocol (RTP) payload of the first network packet.

12. The method of claim 8, wherein the network interface device generates an audio video bridging (AVB) packet using the first network packet when the public announcement audio is not in the AVB format, and the generated AVB packet is re-routed to a switch interfacing with the network interface device.

13. The method of claim 12, wherein the re-routed AVB packet is sent to the network interface device by the switch and processed by the network interface device, before being transferred directly to the audio system for playback.

14. A system for use on a transportation vehicle, the system comprising:

a network device;

a seat device of a seat including a processor and a memory coupled to one another, and to the network interface device in which the network interface device is configured to:

receive a network packet including a payload at a receiving port of the network interface device;

identify public announcement audio in the payload of the network packet by evaluating an identifier included in the network packet;

extract the public announcement audio from the payload of the network packet;

generate a first control signal for an audio system of the seat by the network interface device for controlling a volume for the audio system for playing the public announcement audio;

transfer the public announcement audio to the audio system, directly from the receiving port via a first port of the network interface device, bypassing the processor of the seat device, wherein the audio system plays the public announcement using the first control signal;

identify that a second network packet received by the network interface device includes non-public announcement audio;

provide the second network packet to the processor that transfers the non-public announcement audio to the audio system with a second control signal; and play the non-public announcement audio by the audio system using the second control signal.

15. The system of claim 14, wherein the network interface device is configured to transfer a payload of the second network packet to the processor using a direct memory access operation.

16. The system of claim 14, wherein the first network packet is an Ethernet frame with an audio video bridging (AVB) payload comprising the public announcement audio.

17. The system of claim 14, wherein the public announcement video is included in a real-time transport protocol (RTP) payload of the first network packet.

18. The system of claim 14, wherein the network interface device generates an audio video bridging (AVB) packet using the first network packet when the public announcement audio is not in the AVB format, and the generated AVB packet is re-routed to a switch interfacing with the network interface device.

19. The system of claim 18, wherein the re-routed AVB packet is sent to the network interface device by the switch, and processed by the network interface device before being transferred directly to the audio system for playback.

20. The system of claim 14, wherein the transportation vehicle is one of a train, bus, ship and an aircraft.

* * * * *